April 2, 1929.　　　R. REINHOLD　　　1,707,318
ELECTRICAL OVEN
Filed Jan. 21, 1928

Inventor:
Richard Reinhold

Patented Apr. 2, 1929.

1,707,318

UNITED STATES PATENT OFFICE.

RICHARD REINHOLD, OF LEIPZIG, GERMANY.

ELECTRICAL OVEN.

Application filed January 21, 1928, Serial No. 248,373, and in Germany January 26, 1927.

My invention relates to electrical ovens adapted for use in cooking, roasting, baking, sterilizing and the like. It is an object of my invention to provide an oven capable of being operated at a lower cost than similar electrical ovens hitherto used.

To this end I equip my oven with a liquid jacket in which a liquid, for instance water, is heated by low-price current during the night, heat being stored in the liquid so that during the day only comparatively small amounts of energy at the higher day rate are required for maintaining the desired temperature.

Electric ovens are very suitable for household purposes as they require practically no attendance and are very clean, smoke and ashes being eliminated, yet they have not been universally adopted because the cost of operation is prohibitive in many cases. This drawback is eliminated by my invention.

Thermostatic means may be provided for cutting out the current supply when a predetermined maximum temperature has been attained and for cutting it in again when the temperature falls below a predetermined minimum.

In the drawings affixed to this specification and forming part thereof an oven embodying my invention is illustrated diagrammatically by way of example.

In the drawings

Fig. 1 is a perspective view of an oven with its rear wall removed, while

Figure 1:
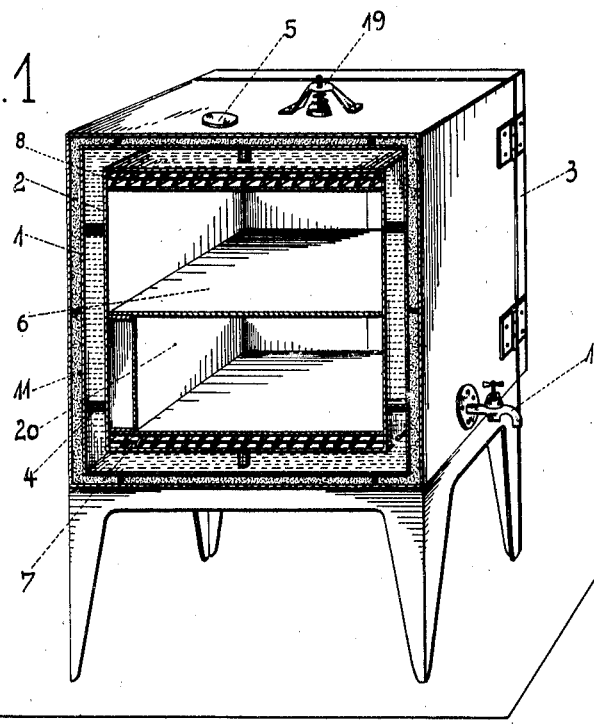

Referring to the drawings, 1 is the oven which has preferably the shape of a box, 2 is the oven chamber which is inserted in the oven 1 with some clearance so that a liquid jacket is formed between the inner and outer walls, 4 being stays for securing the chamber 2 in the outer casing 1. 5 is a screw plug for filling the jacket with liquid, 6 is a horizontal partition in the oven chamber, and 7 and 8 are electrical heating resistances at the bottom and the top of the chamber 2, respectively. The heating resistances are connected with line wires 9, 9 and equipped with a switch 10 as shown in Fig. 2, by which either the lower resistance 7 or both resistances 7, 8 may be cut in for heating the liquid in the jacket and, at the same time, the chamber of the oven. 11 is an insulating lining on the outside of the oven 1.

The oven is heated during the night at the low night charge. The energy required in the daytime for maintaining the oven at the temperature required for cooking, baking, roasting, etc. is thus comparatively small. As the heating rate during the night is low, the heating resistance 7 may be adjusted for about 900 watts, while in existing ovens several resistances at 2000 watts are required. With such a small resistance the oven may be connected to any lighting system. As a rule only the lower resistance 7 is in operation, the space above the partition 6 being used for keeping food warm, for slow cooking, sterilizing, and other purposes. The upper resistance 8 is cut in only when it is desired to increase the temperature for rapid cooking or baking.

Figure 2:
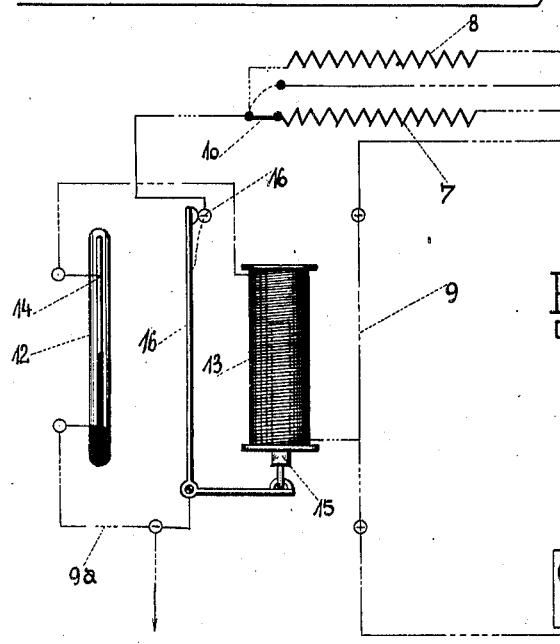
Fig. 2 is a diagram of connections.

A thermostat comprising a thermometer 12 and a relay 13 as shown in Fig. 2 may be provided for cutting out the supply of energy when a predetermined maximum temperature has been attained, and for cutting it in again when the temperature falls below a predetermined minimum. The upper limit at which the current is cut out is as a rule the boiling point of the liquid.

The relay 13 is connected in parallel to the line wires 9, 9. The relay circuit 9ª is normally open, but is closed when the mercury column of the thermometer rises as far as a contact 14. 16 is a switch in the supply line which is controlled by the armature 15 of the relay 13. Normally the weight of the armature holds the switch 16 closed but when the relay is excited at the maximum temperature and attracts its armature 15, the switch 16 is opened and the supply line is interrupted.

Preferably an automatic time switch 17 may be provided in the system for automatically cutting in and out the night current and also for limiting the cooking period so as to prevent overcooking and burning of the food.

The apparatus illustrated in Fig. 2 may be arranged in a chamber formed by a vertical partition 20 below the horizontal partition 6.

A safety valve 19 is provided for preventing damage or explosion due to excessive pressure in case the thermostat 12, 13 should fail to operate.

18 is a drain cock for discharging hot water from the jacket, for instance for preparing a bath.

The oven may also be utilized for heating the room in which it is placed by opening the door 3.

By designing the oven with a liquid jacket, as described, the cost of current is much reduced as compared with existing electrical ovens without detracting from the output, and, as mentioned above, the oven may also be utilized for preparing hot water and for the heating of rooms. Overcooking and burning of food are prevented by the thermostat means described.

I wish it to be understood that I do not desire to be limited to the exact details of construction shown and described for obvious modifications will occur to a person skilled in the art.

I claim:—

An electrical oven comprising an oven chamber, a liquid jacket insulated on the outside surrounding said chamber, electrical means above and below said chamber for heating the liquid in said jacket, a partition in said chamber, means for supplying energy to said heating means, and automatic means including a time switch for controlling said energy-supplying means in accordance with the temperature of the water in said jacket.

In testimony whereof I affix my signature.

RICHARD REINHOLD.